(12) United States Patent
Kobayashi (10) Patent No.: US 8,355,432 B2
(45) Date of Patent: Jan. 15, 2013

(54) IMAGE-PROCESSING APPARATUS AND METHOD

(75) Inventor: Satoru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1286 days.

(21) Appl. No.: 12/116,129

(22) Filed: May 6, 2008

(65) Prior Publication Data

US 2008/0279286 A1    Nov. 13, 2008

(30) Foreign Application Priority Data

May 10, 2007  (JP) ................................. 2007-125454

(51) Int. Cl.
*H04N 5/783* (2006.01)
*G06K 9/46* (2006.01)

(52) U.S. Cl. .......................... 375/240; 386/343; 382/232

(58) Field of Classification Search .................. 382/125, 382/232, 236; 386/46, 83, 95, 109, 111, 386/112, 125; 375/240, 240.03, 240.12, 375/240.16, 240.23, 240.24; 348/441, 569
See application file for complete search history.

(56) References Cited

U.S. PATENT DOCUMENTS

| | | | | |
|---|---|---|---|---|
| 5,325,347 A * | 6/1994 | Sako | ............................ | 369/47.3 |
| 6,654,539 B1 * | 11/2003 | Duruoz et al. | ................ | 386/343 |
| 7,092,023 B2 * | 8/2006 | Hayashi | .................... | 348/333.05 |
| 7,751,690 B2 * | 7/2010 | Kawashita et al. | ........... | 386/241 |
| 7,764,868 B2 * | 7/2010 | Okada et al. | .................. | 386/241 |
| 7,881,583 B2 * | 2/2011 | Naito et al. | .................... | 386/343 |
| 2002/0009289 A1 * | 1/2002 | Morishita et al. | ............... | 386/83 |
| 2003/0001964 A1 * | 1/2003 | Masukura et al. | ............ | 348/441 |
| 2005/0053130 A1 * | 3/2005 | Jabri et al. | ..................... | 375/240 |
| 2005/0055710 A1 * | 3/2005 | Aoki et al. | ....................... | 725/32 |
| 2005/0187960 A1 * | 8/2005 | Nomura | ........................ | 707/101 |
| 2005/0232354 A1 * | 10/2005 | Chen | ........................ | 375/240.16 |
| 2005/0276567 A1 * | 12/2005 | Okuyama et al. | ............... | 386/46 |
| 2006/0109900 A1 * | 5/2006 | Shen | ........................ | 375/240.03 |
| 2006/0222326 A1 * | 10/2006 | Komi et al. | ..................... | 386/83 |
| 2007/0110396 A1 * | 5/2007 | Itoh et al. | ........................ | 386/95 |

FOREIGN PATENT DOCUMENTS

| | | |
|---|---|---|
| JP | 2004-186845 A | 7/2004 |
| JP | 2005-117541 A | 4/2005 |
| JP | 2006-311079 A | 11/2006 |

* cited by examiner

*Primary Examiner* — Michael Thier
*Assistant Examiner* — Prince A Mensah
(74) *Attorney, Agent, or Firm* — Canon USA, Inc., IP Division (57) ABSTRACT

An image-processing apparatus is configured to read encoded video data from a recording medium, decode the encoded video data, and re-encode the decoded video data. Further, the image-processing apparatus is configured to record information about a viewing-operation-history relating to the encoded video data and determine a target bit rate of the re-encoding based on the information about the viewing-operation-history. An image-processing method includes reading encoded video data from a recording medium, decoding the encoded video data, detecting information about a viewing-operation history relating to the encoded video data, re-encoding decoded video data obtained at the decoding step, and determining a target bit rate of the re-encoding performed at the encoding step based on the information about the viewing-operation-history.

17 Claims, 9 Drawing Sheets

| TIME | VIEWING OPERATION | NUMBER | SPEED (n TIMES) |
|---|---|---|---|
| t0-t1 | PLAYBACK | 1 | 1 |
| t1-t2 | PLAYBACK | 2 | 0.5 |
| t2-t3 | PLAYBACK | 1 | 1 |
| t3-t4 | FAST-FORWARDING PLAY | 1 | 2 |
| t4-t5 | PLAYBACK | 1 | 1 |
| t5-t6 | FAST-FORWARDING PLAY | 2 | 4 |
| t6-t7 | PLAYBACK | 1 | 1 |
| t7-t8 | PLAYBACK | 4 | 0.25 |

FIG. 5

| TIME | VIEWING OPERATION | NUMBER | SPEED (n TIMES) |
|---|---|---|---|
| t0-t1 | PLAYBACK | 1 | 1 |
| t1-t2 | FAST-FORWARDING PLAY | 1 | 2 |
| t2-t3 | PLAYBACK | 1 | 1 |
| t3-t4 | FAST-FORWARDING PLAY | 1 | 2 |
| t4-t5 | PLAYBACK | 1 | 1 |

| TIME | VIEWING OPERATION | NUMBER | SPEED (n TIMES) |
|---|---|---|---|
| t0-t1 | PLAYBACK | 1 | 1 |
| t1-t2 | PLAYBACK | 1 | 0.5 |
| t2-t3 | PLAYBACK | 1 | 1 |
| t3-t4 | FAST-FORWARDING PLAY | 1 | 2 |
| t4-t5 | PLAYBACK | 1 | 1 |
| t5-t6 | FAST-FORWARDING PLAY | 1 | 4 |
| t6-t7 | PLAYBACK | 1 | 1 |
| t7-t8 | PLAYBACK | 1 | 0.25 |

| TIME | PLAY LIST | NUMBER |
|---|---|---|
| t0-t1 | WITHOUT REFERENCE | 0 |
| t1-t2 | WITH REFERENCE | 1 |
| t2-t3 | WITHOUT REFERENCE | 0 |
| t3-t4 | WITH REFERENCE | 2 |
| t4-t5 | WITHOUT REFERENCE | 0 |

IMAGE-PROCESSING APPARATUS AND METHOD

BACKGROUND OF THE INVENTION

1. Field of the Invention

The present invention relates to an image-processing apparatus and a method, and particularly relates to an apparatus and a method that are provided to transcode compressed and encoded video data.

2. Description of the Related Art

Encoding systems such as the Moving Picture Experts Group Phase-2 (MPEG-2) encoding system have been established as technologies for compressing and encoding image data. Manufacturers have developed and commercialized image-pickup devices including digital cameras, digital video cameras, and digital-versatile-disk (DVD) recorders that are configured to record image data (especially video data) under the MPEG-2 encoding system. Users can play recorded image data back by using the above-described devices, or a personal computer, a DVD player, and so forth.

A bit rate can be changed by temporarily decoding video data compressed and encoded under the MPEG-2 encoding system and re-encoding the decoded video data. The above-described technology is usually referred to as transcoding. The transcoding technology is usually performed to reduce a data amount. Namely, video data is re-compressed at a bit rate lower than that used before the transcoding is performed. For example, encoded video data recorded through the digital video camera, the encoded video data corresponding to a plurality of DVDs, can be recorded onto a single DVD through transcoding.

A variable-bit-rate (VBR) encoding system has been established for increasing the encoding efficiency of the MPEG-2 encoding system. The VBR encoding denotes a method of variably controlling a bit rate according to the complexity of image data and/or the magnitude of movement in each of frames of video data.

Technologies of encoding the video data corresponding to a scene in which a user is interested with high image quality by changing a bit rate based on a viewing history describing the contents, performers, or other characteristics of a program viewed by the user are available. One of the above-described technologies is disclosed in Japanese Patent Laid-Open No. 2004-186845.

The technology disclosed in Japanese Patent Laid-Open No. 2004-186845 allows for encoding video data corresponding to a scene showing a performer who had been viewed by the user with high image quality, for example.

However, not all the scenes showing the performer who had been viewed by the user is of interest to the user. On the contrary, such scenes may be of little interest to the user and the user may not wish to view the scenes. Therefore, encoding all video data corresponding to a scene(s) determined based on an appearance of the performer in such scene(s) with high image quality may lead to a waste of a recording medium.

SUMMARY OF THE INVENTION

The present invention provides an image-processing apparatus and a method that determine the degree of a user's interest in a scene based on information about a history of viewing operations performed by the user and that re-encode the video data corresponding to a scene in which the user is interested with accuracy and high image quality.

According to an aspect of the present invention, an image-processing apparatus includes a read unit configured to read encoded video data from a recording medium, a decoding unit configured to decode the encoded video data, a record unit configured to record information about a viewing-operation-history relating to the encoded video data, an encoding unit configured to re-encode decoded video data transmitted from the decoding unit, and a bit-rate-determination unit configured to determine a target bit rate of the re-encoding performed by the encoding unit based on the information about the viewing-operation-history.

According to another aspect of the present invention, an image-processing method includes reading encoded video data from a recording medium, decoding the encoded video data, detecting information about a viewing-operation history relating to the encoded video data, re-encoding decoded video data obtained at the decoding step, and determining a target bit rate of the re-encoding performed at the encoding step based on the information about the viewing-operation-history.

Further features and aspects of the present invention will become apparent from the following detailed description of exemplary embodiments with reference to the attached drawings.

DESCRIPTION OF THE EMBODIMENTS

Numerous embodiments, features and aspects of the present invention are described with reference to the drawings.

First Embodiment

Figure 1:
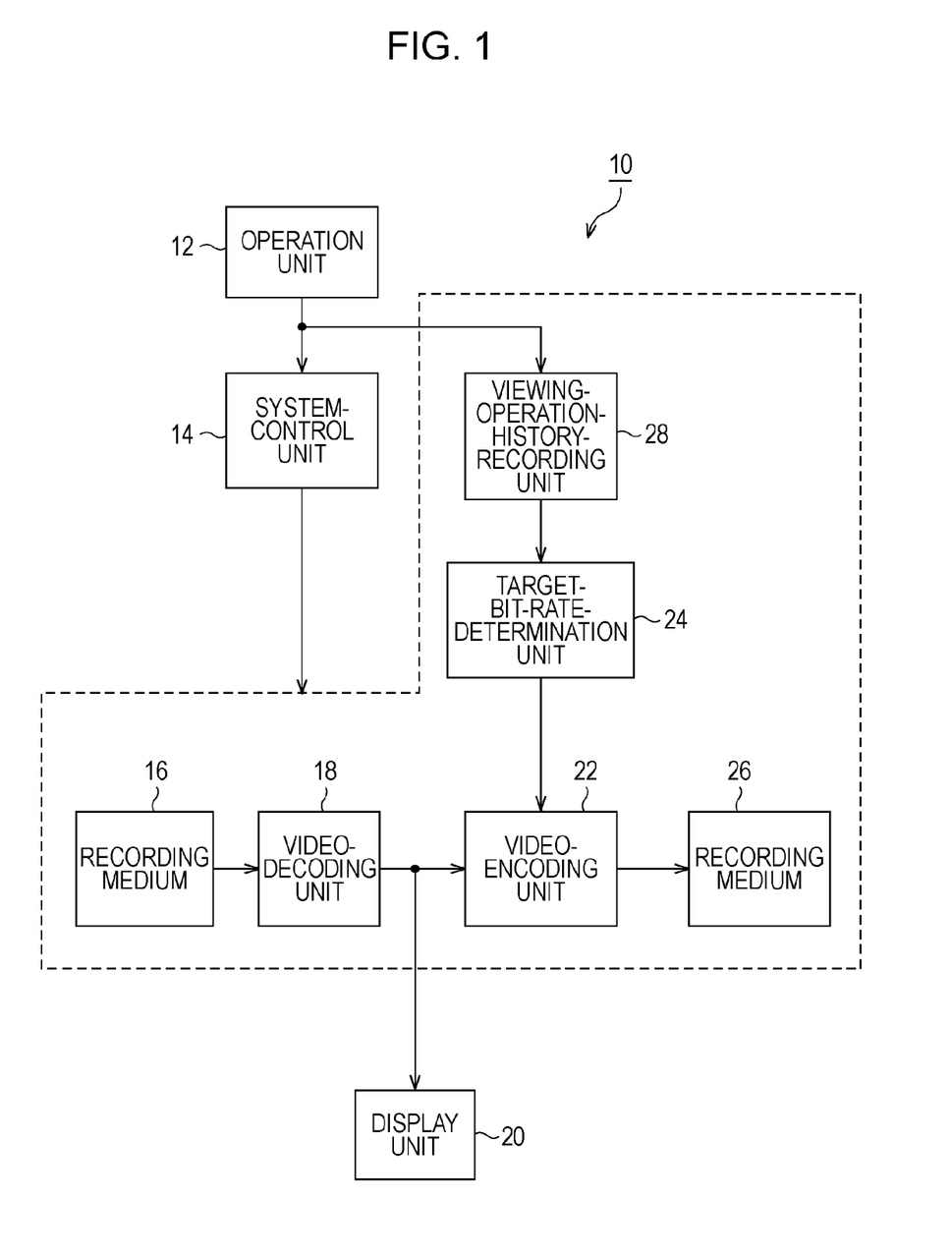
FIG. 1 is a block diagram showing an exemplary configuration of an image-recording-and-reproducing apparatus according to a first exemplary embodiment of the present invention.

FIG. 1 is a block diagram showing an exemplary configuration of an image-recording-and-reproducing apparatus according to a first exemplary embodiment of the present invention. In the first embodiment, video data is compressed and encoded under the MPEG-2 encoding system. The MPEG-2 encoding system, (which is primarily comprised of discrete-cosine-transform (DCT) processing, quantization processing, and variable-length-coding processing), includes intra-frame-coding processing, inter-frame-coding (predictive coding) processing, and motion-compensation processing.

A user instructs a system-control unit 14 of an image-recording-and-reproducing apparatus 10 to perform various types of operations and transmits, for example, an order for transcoding to the system control unit 14 through an operation unit 12. The various types of operations include, for example, normal-playback processing, fast-forwarding-play processing, fast-rewinding-play processing, and stop processing. The system-control unit 14 controls each of the following units according to the user operating the operation unit 12.

Encoded video data which is not yet subjected to the transcoding is recorded onto a recording medium 16. A video-decoding unit 18 reads and decodes the recorded encoded video data, and outputs video data for reproduction. A display unit 20 produces the video data for reproduction decoded by the video-decoding unit 18 on a display screen, as video.

The image-recording-and-reproducing apparatus 10 includes a video-encoding unit 22 to perform transcoding. The video-encoding unit 22 encodes video data output from the video-decoding unit 18 according to a target bit rate determined by a target-bit-rate-determination unit 24 (re-encoding processing). Image data encoded by the video-encoding unit 22 is recorded onto a recording medium 26.

A viewing-operation-history-recording unit 28 records data on the history of playback operations performed by the user through the operation unit 12. For transcoding the video data corresponding to the data on the history of the playback operations performed by the user, the target-bit-rate-determination unit 24 detects and refers to the viewing-operation-history data recorded in the viewing-operation-history-recording unit 28, and determines a target bit rate for each of frames and/or blocks for encoding. Details on the above-described processing are described below. The target bit rate may be expressed as an encoding amount assigned to each of the frames and/or the blocks.

Figure 2:
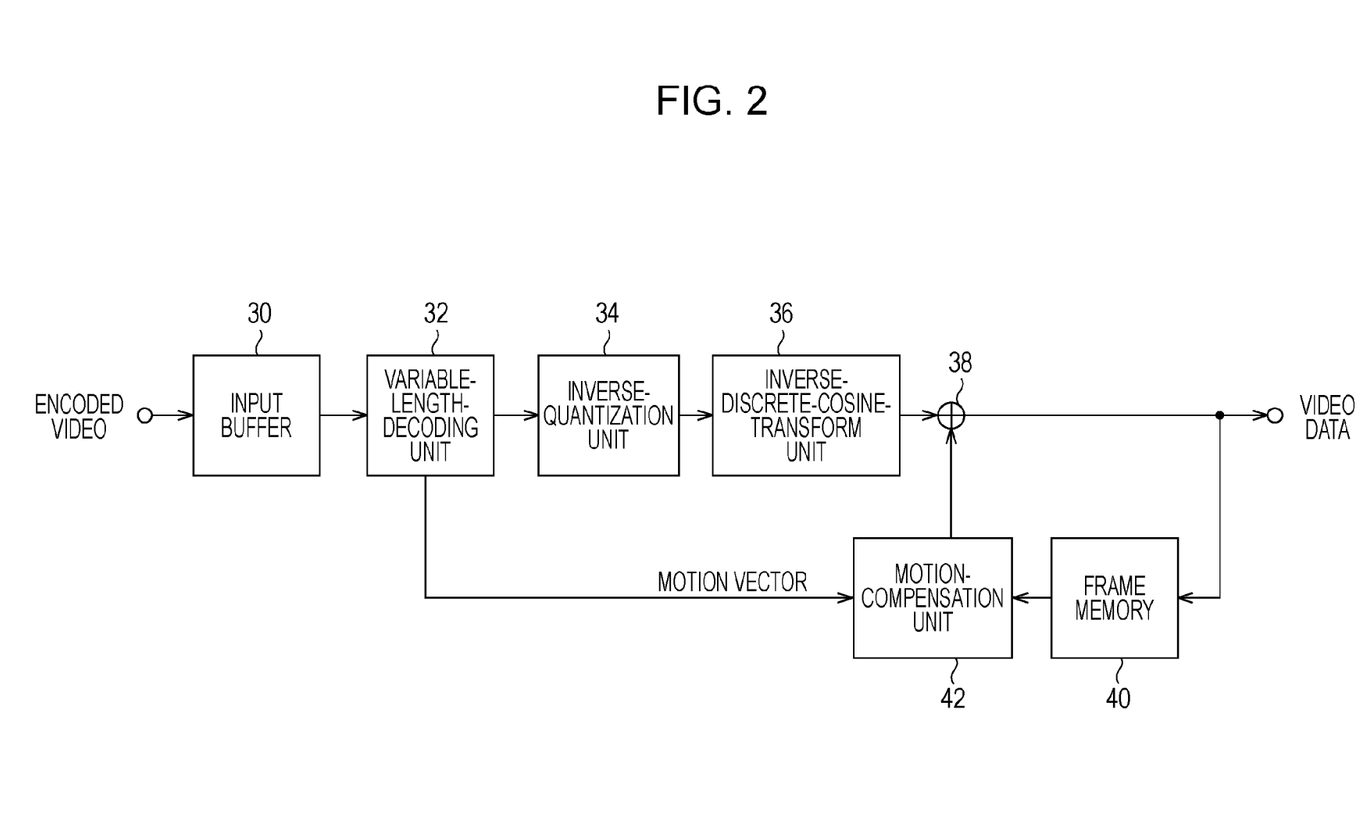
FIG. 2 is a block diagram showing an exemplary configuration of a video-decoding unit according to the first exemplary embodiment.

FIG. 2 is a block diagram showing an exemplary configuration of the video-decoding unit 18. The encoded video data read from the recording medium 16 is stored in an input buffer 30 in sequence. The encoded video data is compressed and encoded through the discrete-cosine-transform (DCT) processing, the quantization processing, and the variable-length-coding processing. A variable-length-decoding unit 32 decodes a code obtained by performing the variable-length-coding processing for the encoded video data stored in the input buffer 30, and generates a quantized transform coefficient. Data on the generated quantized transform coefficient is transmitted to an inverse-quantization unit 34. The variable-length-decoding unit 32 separates data on a motion vector used to provide motion compensation, where the motion vector is multiplexed on the encoded video data stored in the input buffer 30, and transmits the motion-vector data to a motion-compensation unit 42.

The inverse-quantization unit 34 performs inverse quantization for the quantized transform coefficient on which data is transmitted from the variable-length-decoding unit 32, and transmits data on a transform coefficient (a representative value) to an inverse discrete-cosine-transform unit 36. The inverse-DCT unit 36 performs inverse DCT processing for the transform coefficient value (the representative value) on which data is transmitted from the inverse-quantization unit 34. Subsequently, a picture is reconstituted for image data subjected to the intra-frame-coding processing. Further, error data is reconstituted for image data subjected to the inter-frame-coding processing (the predictive-coding processing), where the error data indicates the difference between an estimated value and the value of the image data.

For the image data subjected to the intra-frame-coding processing, an addition unit 38 outputs data output from the inverse-DCT unit 36, as it is. On the other hand, for the image data subjected to the inter-frame-coding processing, the addition unit 38 adds the estimated value on which data is transmitted from the motion-compensation unit 42 to data output from the inverse-DCT unit 36. The data output from the addition unit 38 becomes decoded image data, and the decoded image data is transmitted to the display unit 20 and/or the video-encoding unit 22.

Image data output from the addition unit 38 is stored in a frame memory 40, so as to decode and provide motion compensation for the image data subjected to the inter-frame-coding processing. The motion-compensation unit 42 reads the image data corresponding to a reference frame for the predictive-coding processing from the frame memory 40. Further, the motion-compensation unit 42 moves the image data according to the motion vector on which data is transmitted from the variable-length-decoding unit 32. The image data subjected to the motion-compensation processing performed by the motion-compensation unit 42 is transmitted to the addition unit 38 as the estimated-value data.

Figure 3:
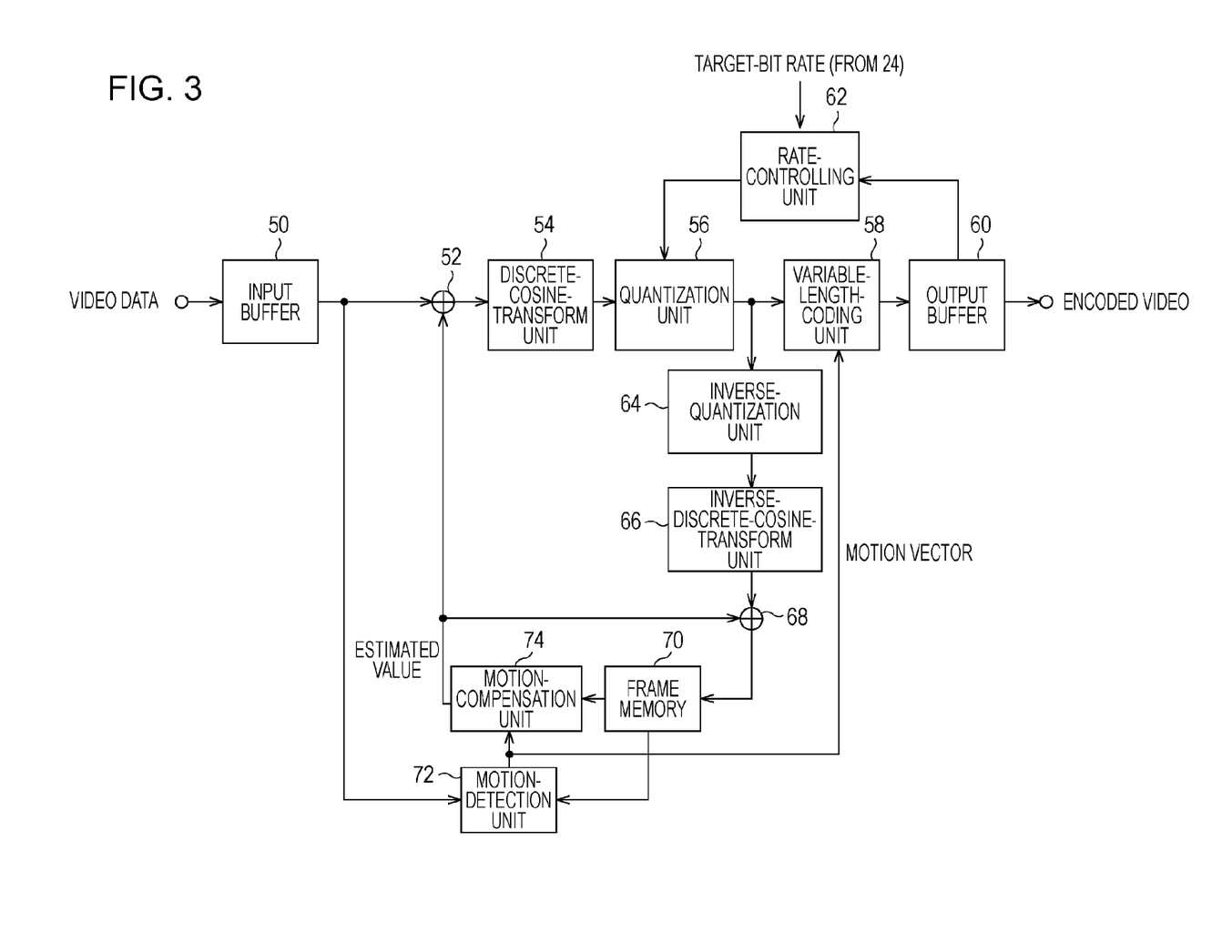
FIG. 3 is block diagram showing an exemplary configuration of a video-encoding unit according to the first exemplary embodiment.

FIG. 3 is a block diagram showing an exemplary configuration of the video-encoding unit 22. An input buffer 50 stores video data (VIDEO DATA) decoded by the video-decoding unit 18 in frames and the stored video data is sequentially read in blocks for encoding. In the case where the intra-frame-coding processing is performed, a subtraction unit 52 outputs image data output from the input buffer 50, as it is. In the case where the inter-frame-coding processing (predictive-coding processing) is performed, the subtraction unit 52 subtracts the estimated value obtained through the motion compensation provided by a motion-compensation unit 74 from the value of image data output from the input buffer 50 and outputs data on a result of the subtraction.

A discrete-cosine-transform unit 54 performs the DCT processing for the data output from the subtraction unit 52, and outputs data on a transform coefficient used for the DCT processing. A quantization unit 56 quantizes the transform-coefficient data output from the discrete-cosine-transform unit 54 according to a quantization scale specified by a rate-controlling unit 62. The amount of generated code can be controlled by changing the quantization scale.

A variable-length-coding unit 58 performs variable-length coding for the quantized transform coefficient on which data is transmitted from the quantization unit 56. Further, the variable-length-coding unit 58 multiplexes motion-vector data on encoded video data so that the image data subjected to the inter-frame-coding processing is decoded, where the motion-vector data is transmitted from a motion-detection unit 72. Data output from the variable-length-coding unit 58 is written onto the recording medium 26 via an output buffer 60. Namely, the encoded video data and the motion-vector data are multiplexed on each other and recorded onto the recording medium 26 as encoded video (ENCODED VIDEO).

The rate-controlling unit 62 monitors the amount of data stored in the output buffer 60, and acquires data on the amount of generated code and the occupancy ratio of the output buffer 60. Then, the rate-controlling unit 62 controls the quantization scale of the quantization unit 56 according to the target-bit-rate information transmitted from the target-bit-rate-determination unit 24 and the generated-code-amount data and the occupancy-ratio data that are acquired from the output buffer 60. Subsequently, the generate-code amount is dynamically controlled under the variable-bit-rate (VBR) system.

The quantized-transform-coefficient data output from the quantization unit 56 is locally decoded, so as to achieve the inter-frame-coding processing. An inverse-quantization unit 64 inversely quantizes the quantized transform coefficient on which data is transmitted from the quantization unit 56, and transmits data on the transform coefficient (representative value) to an inverse-discrete-cosine-transform (inverse DCT) unit 66. The inverse-DCT unit 66 performs inverse-DCT processing for the transform-coefficient value (representative value) on which data is transmitted from the inverse-quantization unit 64. Subsequently, image data is reconstituted for image data subjected to the intra-frame-coding processing. Further, error data is reconstituted for image data subjected to the inter-frame-coding processing (predictive-coding processing), where the error data indicates the difference between an estimated value and the value of the image data.

For decoding the image data subjected to the intra-frame-coding processing, an addition unit 68 outputs data output from the inverse-DCT unit 66, as it is. On the other hand, for the image data subjected to the inter-frame-coding processing (predictive-coding processing), the addition unit 68 adds the estimated value on which data is transmitted from the motion-compensation unit 74 to data output from the inverse-DCT unit 66. Image data output from the addition unit 68 is stored in a frame memory 70, so as to be referred to for achieving the inter-frame-coding processing.

The motion-detection unit 72 calculates a motion vector by comparing a reference image on which data is stored in the frame memory 70 and the current image from the input buffer 50, and transmits data on the calculated motion vector to each of the motion-compensation unit 74 and the variable-length-coding unit 58. The motion-compensation unit 74 reads the image data corresponding to a reference frame provided to achieve the predictive-coding processing from the frame memory 70. Further, the motion-compensation unit 74 moves the read image data according to the motion vector on which data is transmitted from the motion-detection unit 72. The image data provided with the motion compensation through the motion-compensation unit 74 is transmitted to each of the subtraction unit 52 and the addition unit 68 as the estimated-value data.

Figure 4:
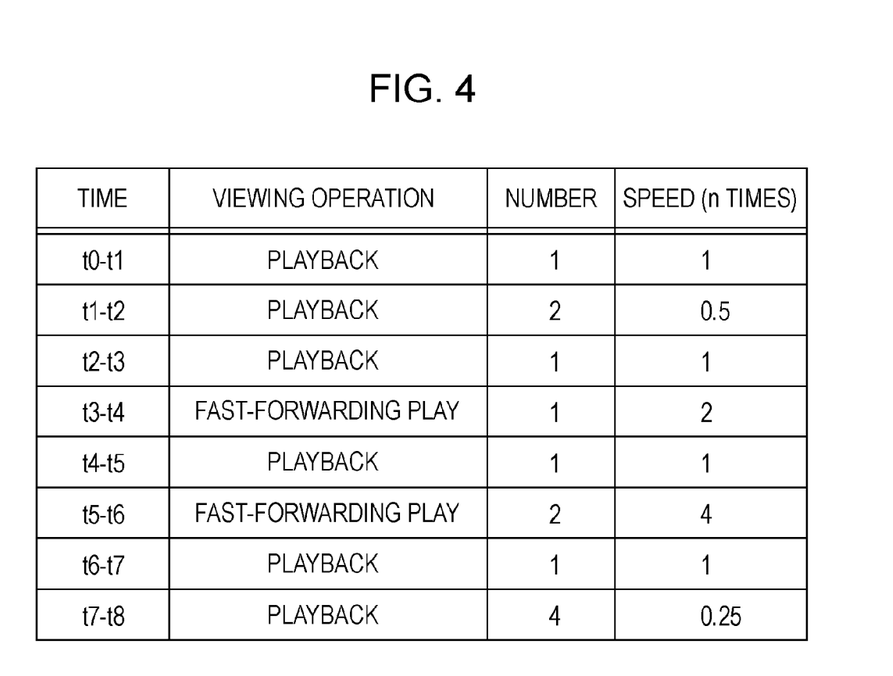
FIG. 4 shows exemplary viewing-operation-history data recorded in a viewing-operation-history-recording unit.

The viewing-operation-history-recording unit 28 is described below in detail with reference to FIG. 4. The viewing-operation-history-recording unit 28 records data on an operation performed to play each of video-data items back, the video-data items being recorded onto the recording medium 16, as the viewing-operation-history data. The viewing-operation-history data includes, for example, time information, viewing-operation information, operation-number information, and speed information, as shown in FIG. 4. When each of the video-data items is viewed once, as video, the viewing-operation-history data is generated and recorded for each viewed video-data item. When the video-data item is viewed a plurality of times, the viewing-operation-history data is updated for each viewing. For example, when a scene for which a fast-forwarding-play operation is performed at the first-viewing time is played back at the second-viewing time, data on the playback-operation history is added and recorded (and/or updated) in the viewing-operation-history-recording unit 28, so as to be ready for a change in the user's interest.

FIG. 4 shows exemplary data on the history of viewing operations performed for video data during the period corresponding to the time of from t0 to t8. According to the above-described exemplary viewing-operation-history data, a single playback is performed at an ordinary viewing speed (ordinary speed) in each of the periods corresponding to the time of from t0 to t1, the time of from t2 to t3, the time of from t4 to t5, and the time of from t6 to t7, two playbacks are performed at a five-tenths times ordinary speed (slow speed) in the period corresponding to the time of from t1 to t2, and four playbacks are performed at a twenty-five-hundredths times ordinary speed (super slow speed) in the period corresponding to the time of from t7 to t8. If part of the video data is slowly played back at a low multiple (100% or less) of ordinary speed, it means that the part is deliberately viewed by a viewer. Therefore, it can be considered that the part is of a high degree of interest to the viewer. Further, as the number of viewing operations grew, the degree of the user's interest increases.

Further, a single fast-forwarding play is performed at two times ordinary speed in the period corresponding to the time of from t3 to t4. Two fast-forwarding plays are performed at four times ordinary speed in the period corresponding to the time of from t5 to t6. If part of the video data is fast-forwarded at a high multiple (over 100%) of ordinary speed, it indicates that the part provokes little attention of the viewer. Therefore, it can be considered that the part is of a low degree of interest to the viewer. Further, as the number or speed of fast-forwarding plays grew, the degree of the user's interest decreases. The ordinary speed typically is a viewing speed which the video was intended to be viewed when produced or mastered; however, ordinary speed may vary from such speed, for example, where video has been converted between video formats having different frame rates.

Operations of the target-bit-rate-determination unit 24 are described in detail with reference to FIGS. 5, 6, 7, 8, 9, and 10. The target-bit-rate-determination unit 24 determines a bit rate which is the target of transcoding. The video-encoding unit 22 re-encodes the video data decoded by the video-decoding unit 18 based on the target bit rate determined by the target-bit-rate-determination unit 24.

Figure 5:
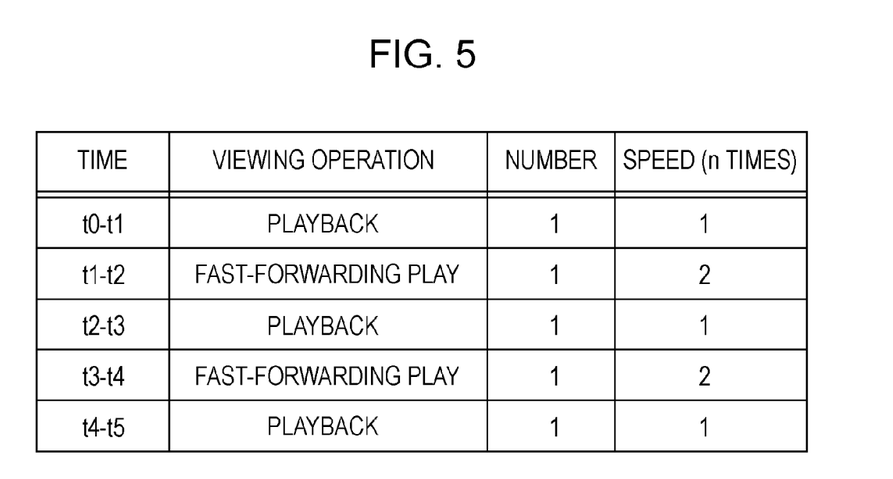
FIG. 5 shows a first exemplary viewing-operation-history data illustrating operations of a target-bit-rate-determination unit.
Figure 6:
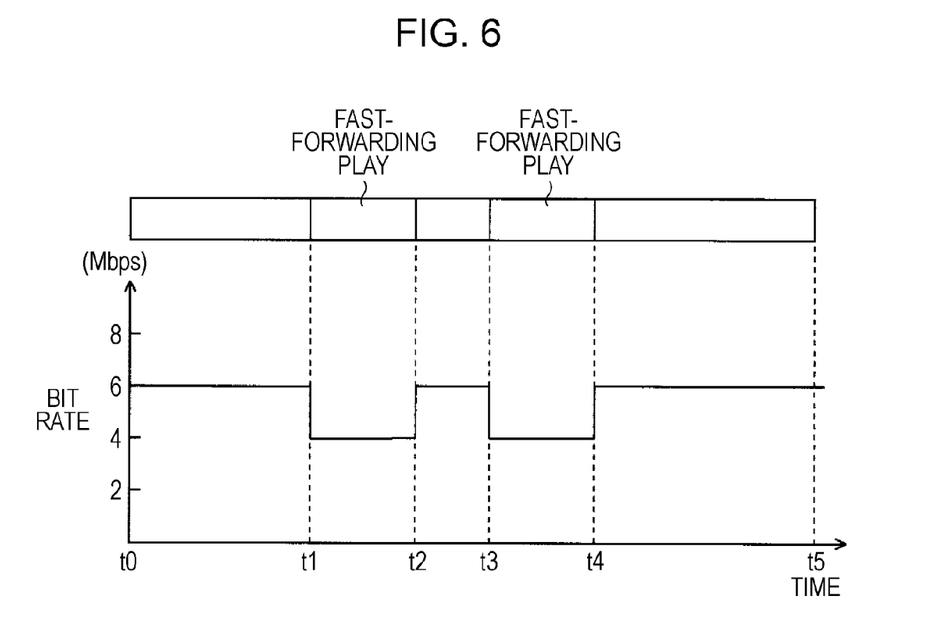
FIG. 6 shows an exemplary varying bit rate corresponding to the first exemplary viewing-operation-history data shown in FIG. 5.

FIG. 5 shows exemplary viewing-operation-history data and FIG. 6 shows an exemplary time variation in the bit rate determined by the target-bit-rate-determination unit 24, where the time-varying bit rate corresponds to the exemplary viewing-operation-history data shown in FIG. 5. In FIG. 6, the horizontal axis indicates the time and the vertical axis indicates the bit rate.

According to the exemplary viewing-operation-history data shown in FIG. 5, the video data is played back in each of the periods corresponding to the time of from t0 to t1, the time of from t2 to t3, and the time of from t4 to t5, and fast-forwarded in each of the periods corresponding to the time of from t1 to t2 and the time of from t3 to t4. According to FIG. 6, the target-bit-rate-determination unit 24 determines a reference bit rate used during an ordinary-playback-operation period to be the rate of 6 Mbps. For example, the reference bit rate may be determined in advance with input from a user. Further, the target-bit-rate-determination unit 24 determines a bit rate used during the fast-forwarding-play-operation period to be the rate of, for example, 4 Mbps, which is lower than the reference bit rate.

Figure 7:
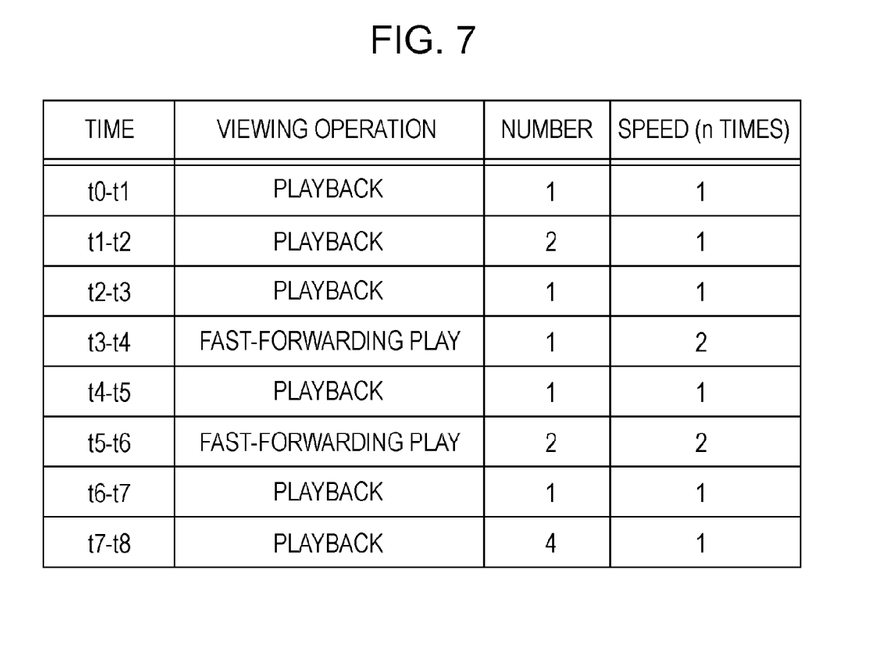
FIG. 7 shows a second exemplary viewing-operation-history data illustrating the operations of the target-bit-rate-determination unit.
Figure 8:
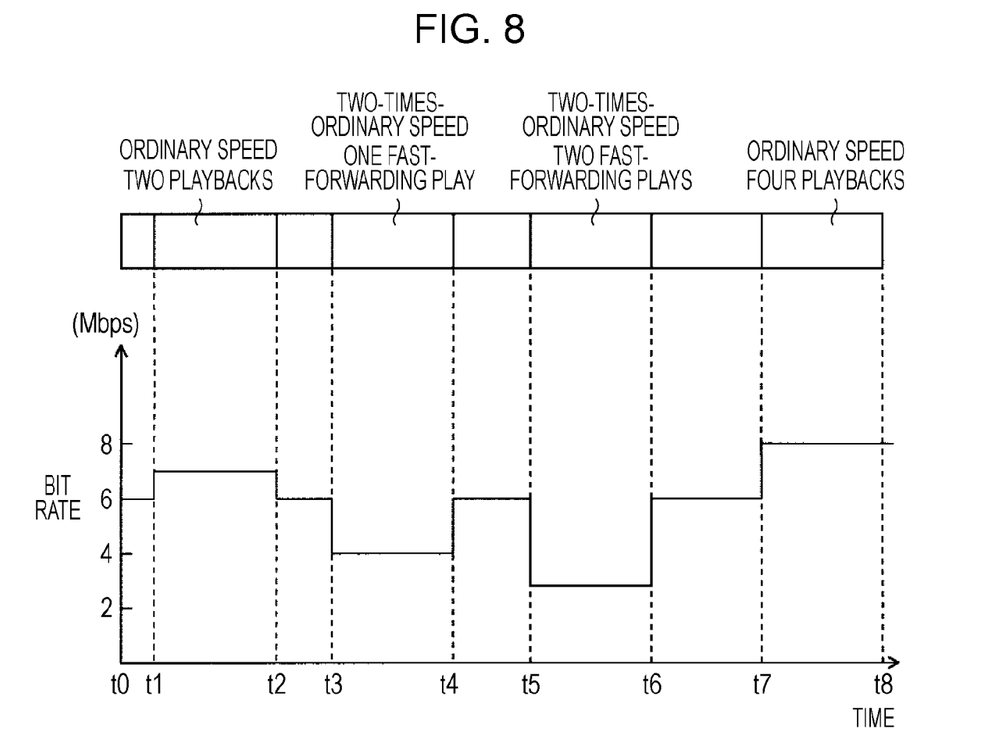
FIG. 8 shows an exemplary varying bit rate corresponding to the second exemplary viewing-operation-history data shown in FIG. 7.

FIG. 7 shows a second exemplary viewing-operation-history data and FIG. 8 shows an exemplary time variation in the bit rate determined by the target-bit-rate-determination unit 24, where the time-varying bit rate corresponds to the exemplary viewing-operation-history data shown in FIG. 7. In FIG. 8, the horizontal axis indicates the time and the vertical axis indicates the bit rate.

In FIG. 7, the viewing operation is performed a plurality of times. An ordinary playback operation (playback at ordinary speed) is performed a single time in each of the periods corresponding to the time of from t0 to t1, the time of from t2 to t3, the time of from t4 to t5, and the time of from t6 to t7. The ordinary playback operation is performed two times in the period corresponding to the time of from t1 to t2. The ordinary playback operation is performed four times in the period corresponding to the time of from t7 to t8. The fast-forwarding-play operation at two times ordinary speed is performed a single time in the period corresponding to the time of from t3 to t4. The fast-forwarding-play operation at two times ordinary speed is performed two times in the period corresponding to the time of from t5 to t6.

Referring to FIG. 8, for the second exemplary viewing-operation-history data shown in FIG. 7, the target-bit-rate-determination unit 24 sets the reference bit rate (of 6 Mbps, for example) as the bit rate used to perform transcoding for the period where the ordinary playback operation is performed a single time. For the period where the fast-forwarding-play operation is performed a single time, the period indicating a low degree of interest of the viewer, the target-bit-rate-determination unit 24 sets the rate of 4 Mbps, for example, which is lower than the reference bit rate. Further, for the period where the number of the fast-forwarding-play operations is two, the period indicating a lower degree of interest of the viewer, the target-bit-rate-determination unit 24 sets the rate of 3 Mbps, for example, which is lower than the bit rate of the period where the fast-forwarding-play operation is performed a single time. For the period where the number of the ordinary-playback operations is two, the period indicating a high degree of interest of the viewer, the target-bit-rate-determination unit 24 sets the rate of 7 Mbps, for example, which is higher than the reference bit rate. Further, for the period where the number of the ordinary-playback operations is four, the period indicating the high degree of interest of the viewer, the target-bit-rate-determination unit 24 sets, for example, the rate of 8 Mbps, which is still higher than the bit rate used in the period where the ordinary-playback operation is performed two times.

Figure 9:
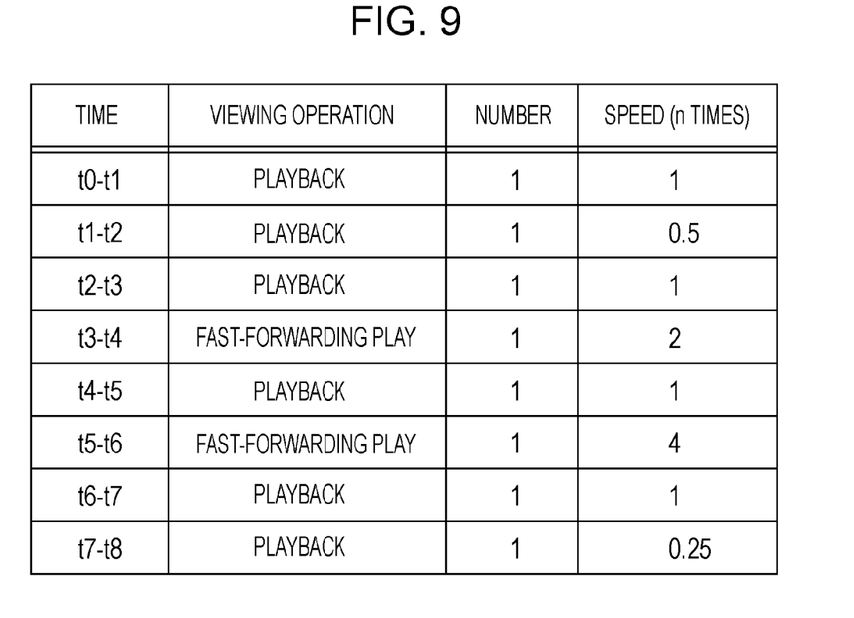
FIG. 9 shows a third exemplary viewing-operation-history data illustrating the operations of the target-bit-rate-determination unit.
Figure 10:
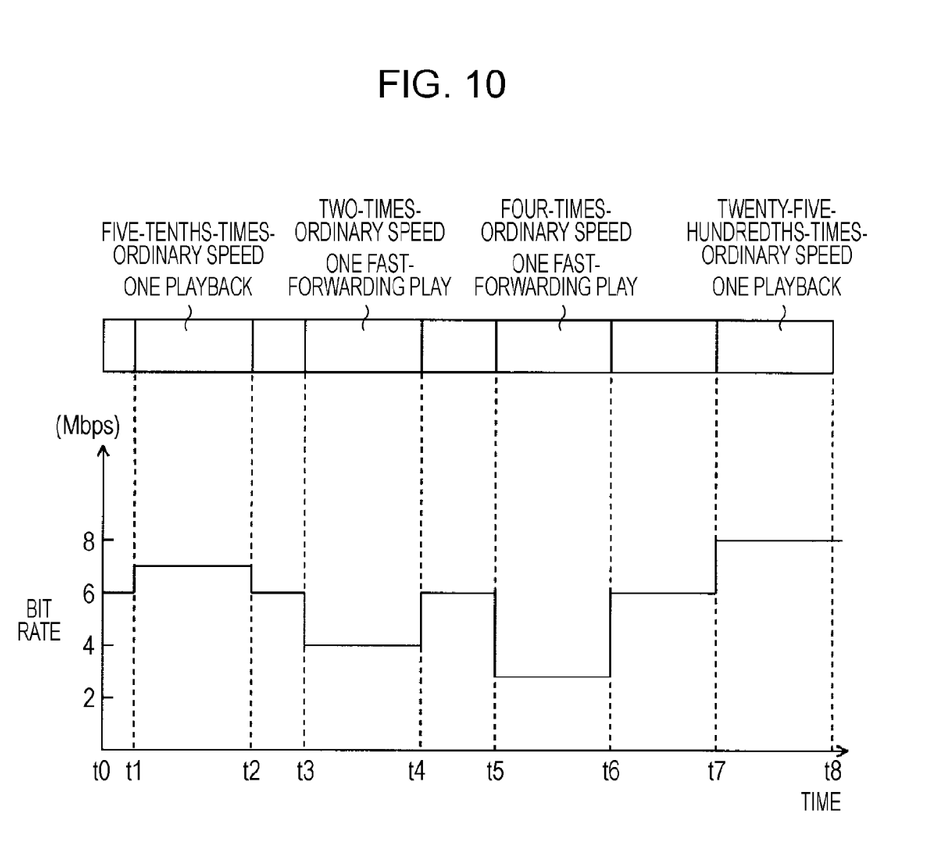
FIG. 10 shows an exemplary varying bit rate corresponding to the third exemplary viewing-operation-history data shown in FIG. 9.

FIG. 9 shows a third exemplary viewing-operation-history data and FIG. 10 shows an exemplary time variation in the bit rate determined by the target-bit-rate-determination unit 24, where the time-varying bit rate corresponds to the third exemplary viewing-operation-history data shown in FIG. 9. In FIG. 10, the horizontal axis indicates the time and the vertical axis indicates the bit rate.

According to the third exemplary viewing-operation-history data shown in FIG. 9, playback operations are performed at a variety of speeds. Namely, an ordinary playback operation (ordinary speed) is performed in each of the periods corresponding to the time of from t0 to t1, the time of from t2 to t3, the time of from t4 to t5, and the time of from t6 to t7. A playback operation is performed at five-tenths times ordinary speed (slow speed) over the period corresponding to the time of from t1 to t2. Another playback operation is performed at a twenty-five hundredths times ordinary speed (super slow speed) over the period corresponding to the time of from t7 to t8. Further, a fast-forwarding-play operation is performed at a two times ordinary speed over the period corresponding to the time of from t3 to t4, and a fast-forwarding-play operation is performed at a four times ordinary speed over the period corresponding to the time of from t5 to t6.

Referring to FIG. 10, for the third exemplary viewing-operation-history data shown in FIG. 9, the target-bit-rate-determination unit 24 sets the reference bit rate (of 6 Mbps, for example) as a bit rate to be used to perform transcoding for the period where the playback operation is performed at ordinary speed, that is, the ordinary-playback-operation period. For the period where the fast-forwarding-play operation is performed at the two times ordinary speed, where the period indicates a low degree of interest of the viewer, the target-bit-rate-determination unit 24 sets, for example, the bit rate of 4 Mbps, which is lower than the reference bit rate. Further, for the period where the fast-forwarding-play operation is performed at the four times ordinary speed, where the period indicates the still lower degree of interest of the viewer, the target-bit-rate-determination unit 24 sets, for example, the bit rate of 3 Mbps, which is lower than the bit rate of the period where the fast-forwarding-play operation is performed at the two times ordinary speed. For the period where the playback operation is performed at five-tenths times ordinary speed (slow speed), where the period indicates a high degree of interest of the viewer, the target-bit-rate-determination unit 24 sets, for example, the bit rate of 7 Mbps, which is higher than the reference bit rate. Further, for the period where the playback operation is performed at twenty-five hundredths times ordinary speed (super slow speed), where the period indicates a still higher degree of interest of the viewer, the target-bit-rate-determination unit 24 sets, for example, the rate of 8 Mbps, which is higher than the bit rate used in the period where the playback operation is performed at the five-tenths times ordinary speed (slow speed). That is to say, the bit rate is increased with decreases in the playback speed.

Thus, the bit rate used to perform the transcoding is determined based on the viewing-operation-history data so that the video data corresponding to a scene which is of a low degree of interest of the viewer can be compressed and encoded with low image quality and the video data corresponding to a scene which is of a high degree of interest of the viewer can be compressed and encoded with high image quality, which allows for aggressively decreasing the data amount. According to the first embodiment, the playback operations corresponding to the playbacks and/or the fast-forwarding plays are described as the viewing-operation-history data.

Second Embodiment

In accordance with a second embodiment of the present invention, the viewing-operation-history data may include information about referring to a playlist. The playlist is achieved by collecting (referring to) scenes which the viewer wants to view and arranging the scenes in desired playback order. The second embodiment may be configured in the same manner shown in FIGS. 1-3 with respect to the first embodiment, for example, or alternatively in similar manner. The second embodiment is further described below with reference to FIGS. 11-13.

Figure 11:
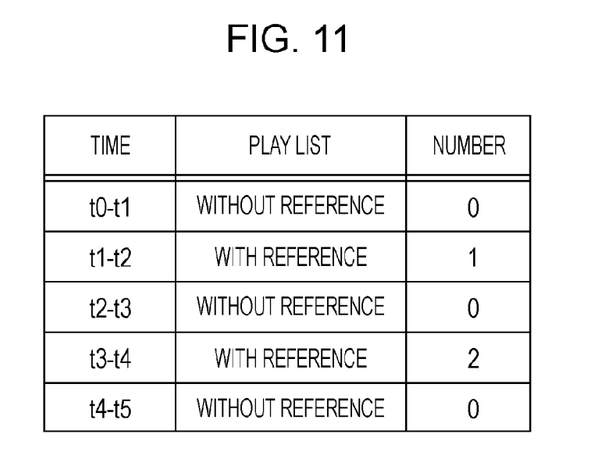
FIG. 11 shows a fourth exemplary viewing-operation-history data illustrating the operations of the target-bit-rate-determination unit in a second embodiment of the present invention.

FIG. 11 shows a fourth exemplary viewing-operation-history data corresponding to any of playlists of predetermined video data. According to the fourth exemplary viewing-operation-history data, the playlist of the above-described video data is not referred to in each of the periods corresponding to the time of from t0 to t1, the time of from t2 to t3, and the time of from t4 to t5. The video data is referred to on the playlist and played back once in the period corresponding to the time of from t1 to t2 and twice in the period corresponding to the time of from t3 to t4.

Figure 12:
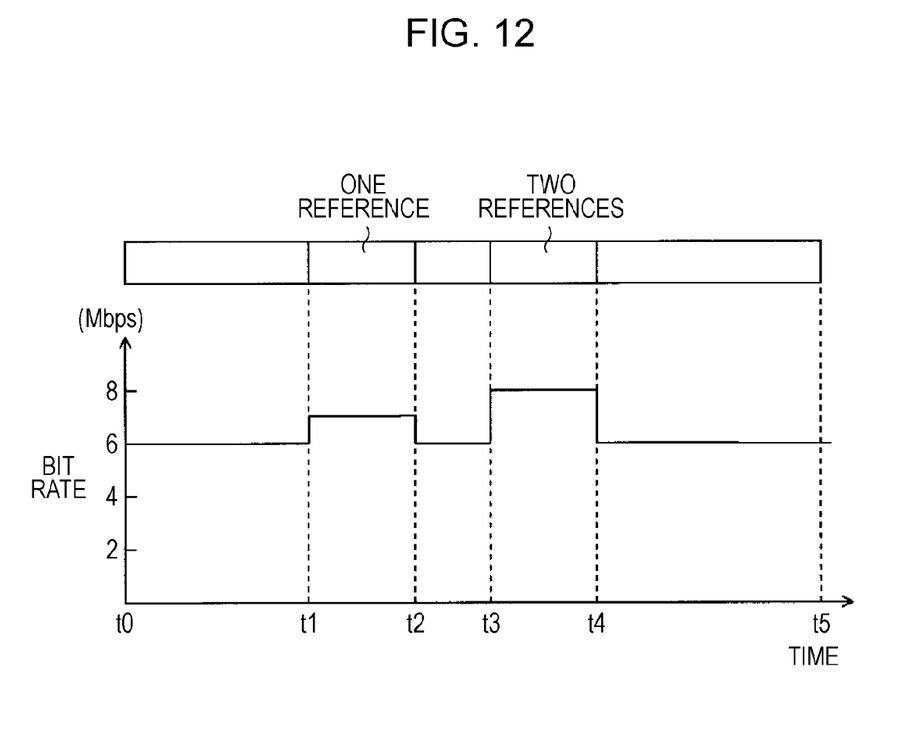
FIG. 12 shows an exemplary varying bit rate corresponding to the fourth exemplary viewing-operation-history data shown in FIG. 11.

FIG. 12 shows an exemplary time variation in the bit rate determined by the target-bit-rate-determination unit 24, where the time-varying bit rate corresponds to the exemplary viewing-operation-history data shown in FIG. 11. In FIG. 12, the horizontal axis indicates the time and the vertical axis indicates the bit rate.

According to the exemplary time variation shown in FIG. 12, the target-bit-rate-determination unit 24 sets the reference bit rate (of 6 Mbps, for example) as a bit rate used to perform transcoding for the period where the video data is not referred to on the playlist. For the period where the video data is referred to a single time on the playlist, where the period indicates a high degree of interest of the viewer, the target-bit-rate-determination unit 24 sets, for example, the bit rate of 7 Mbps, which is higher than the reference bit rate. Further, for the period where the video data is referred to two times on the playlist, where the period indicates an even higher degree of interest of the viewer, the target-bit-rate-determination unit 24 sets, for example, the bit rate of 8 Mbps, which is even higher than the bit rate of the period where the video data is referred to a single time on the playlist. That is to say, the bit rate becomes higher than the reference bit rate with increases in the number of times the playlist is referred to.

Figure 13:
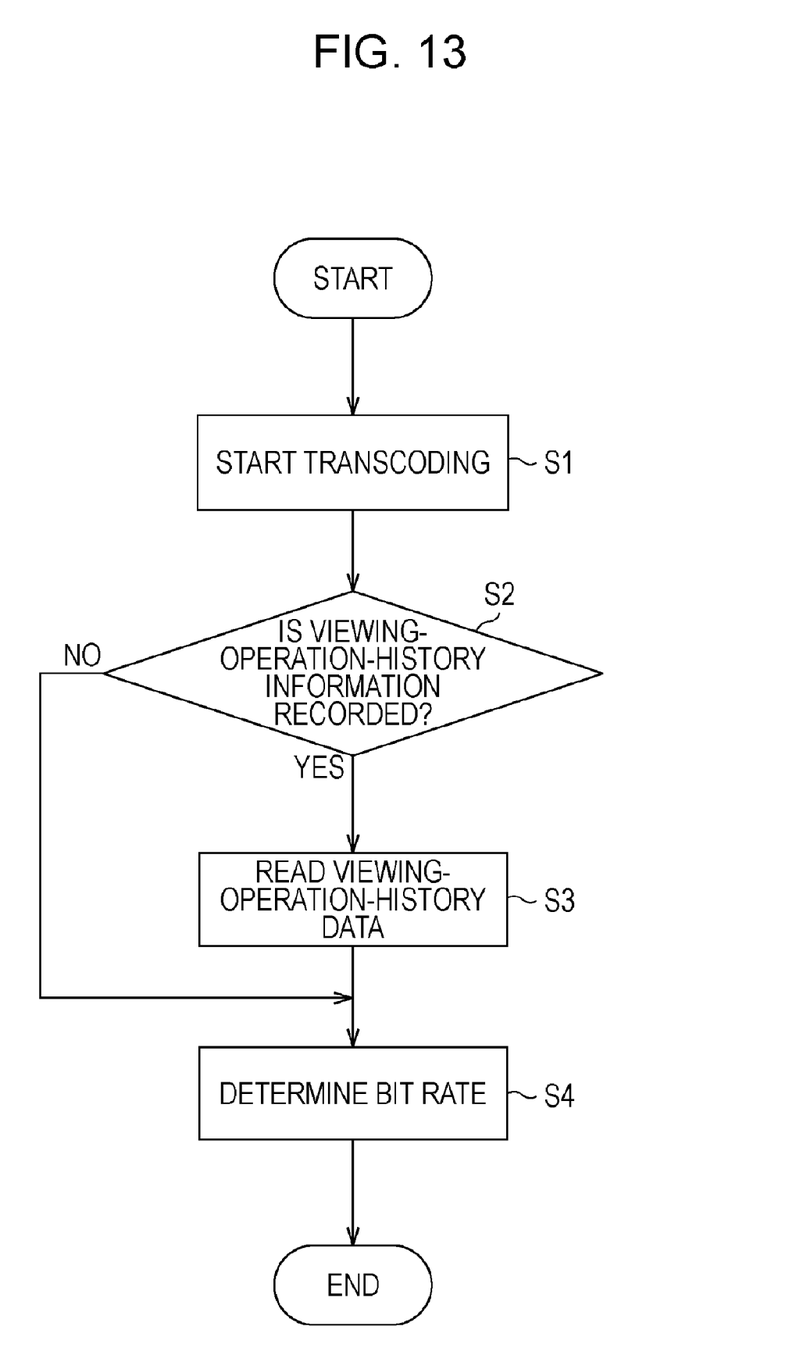
FIG. 13 is an exemplary flowchart showing exemplary operations of the target-bit-rate-determination unit for the first and second embodiments.

FIG. 13 shows an exemplary flowchart of exemplary bit-rate-determination operations performed by the target-bit-rate-determination unit 24 in the first and second embodiments. Transcoding is started at step S1. At step S2, it is checked whether or not the viewing-operation-history data corresponding to video data for the transcoding is recorded in the viewing-operation-history-recording unit 28. If the viewing-operation-history data is recorded in the viewing-operation-history-recording unit 28, (YES at step S2), the target-bit-rate-determination unit 24 reads the viewing-operation-history data from the viewing-operation-history-recording unit 28 at step S3, and determines a bit rate according to any of the above-described embodiments at step S4. If it is determined that no viewing-operation-history data is recorded in the viewing-operation-history-recording unit 28, (NO at step S2, the target-bit-rate-determination unit 24 uses the reference bit rate (as described above) for the video data for the transcoding at step S4.

According to the first and second embodiments, it becomes possible to transcode the video data corresponding to a scene which is of a high degree of the user's interest with high image quality and the video data corresponding to a scene which is of a low degree of the user's interest with low image quality by changing the target bit rate used at the transcoding time based on the viewing-operation-history data. Consequently, it becomes possible to reduce the data amount and adjust the image quality according to the degree of the user's interest.

According to the first and second embodiments, video data is encoded under the MPEG-2 encoding system. However, other video-data-encoding system including, for example, the H.264-encoding system may be used. Further, it is obvious that the compression system used for the video data recorded onto the recording medium 16 may be different from that used for the video data recorded onto the recording medium 26.

The recording mediums 16 and 26 may be configured as separate recording mediums, as is the case with a hard disk and an optical disk. On the other hand, the recording mediums 16 and 26 may be configured as separate recording areas provided on the same recording medium.

Other Embodiments

Each of the units generating the image-recording-and-reproducing apparatus and each of the steps of the method performed to record and reproduce image data according to the first and second exemplary embodiments of the present invention can be achieved by an operating program stored in a random-access memory (RAM), a read-only memory (ROM), etc. of a computer. Each of the above-described program and a computer-readable recording medium recording the program may constitute the present invention.

Any system, apparatus, method, or program stored in a machine readable medium consistent with the present invention serves as an embodiment of the present invention. The present invention can be fabricated as a single device or multiple devices.

Further, the present invention can also be achieved by directly supplying program code of software for implementing the functions of the above-described embodiments to a system and/or an apparatus that can execute or store the program code. The present invention can also be achieved by supplying the above-described program code from remote locations, and reading and executing the supplied program code by a computer of the system and/or the apparatus. A general purpose computer, such as a P.C., Macintosh, or UNIX workstation may be used. Alternatively any circuitry that can execute instructions qualifies as a computer as used herein. For example, a programmable microprocessor included in a video playback qualifies.

Such program code itself, installed on a computer so as to achieve the functions of the present invention through the computer, serves as an embodiment of the present invention. Namely, a computer program itself, provided to achieve the functions of the present invention, may constitute the present invention.

Such computer program may be object code, a program executed by an interpreter, script data supplied to an operating system (OS), or the like. Alternatively, the computer program may be implemented as firmware.

A recording medium used to supply the program may be, for example, a magnetic tape, a floppy disk, a hard disk, an optical disk, a magneto-optical disk, a magneto-optical (MO) disk, a compact disk (CD)-ROM, a CD-recordable (R), or a CD-rewritable (RW). Further, the recording medium may be a digital versatile disk (DVD) such as a DVD-ROM, DVD-R, DVD+R, DVD-RW, DVD+RW, or dual layer DVD storage device. The storage device may alternatively be a Blu-Ray Disc™, or the like. Alternatively, a nonvolatile memory card, a flash memory, a ROM, or microprocessor based storage medium may be used as a storage medium.

Further methods of supplying the program to the system and/or the apparatus are described below. For example, the program can be supplied by accessing to a homepage provided on the Internet through the browser of a client computer and downloading a computer program itself of an exemplary embodiment of the present invention from the homepage. The program can also be supplied by downloading compressed file data including the automatic-install function to the recording medium such as the hard disk.

Further, the program can also be supplied to the system and/or the apparatus by dividing program code generating the above-described program into at least two file-data items and downloading each of the file-data items from different homepages. Namely, a World Wide Web (WWW) server encouraging a plurality of users to download program file data used to achieve the functions of the present invention through a computer may constitute the present invention.

Further, a program according to an exemplary embodiment of the present invention may be encrypted, recorded onto the recording medium such as the CD-ROM, and distributed to a user. Then, a user satisfying predetermined conditions may be encouraged to download key information used to decrypt the encrypted program from a homepage via the Internet. The encrypted program can be executed by using the above-described key information so that the program is installed on a computer and achieved.

Further, the functions of the above-described exemplary embodiments may be achieved by the computer executing the read program. The functions of the above-described exemplary embodiments may also be achieved by the computer executing part of and/or the entire actual processing through an OS or the like running on the computer based on instructions of the program.

Still further, the program read from the recording medium may be written into a memory of a function-expansion board inserted into the computer and/or a function-expansion unit connected to the computer. Then, a central-processing unit (CPU) or the like of the function-expansion board and/or the function-expansion unit may execute part of and/or the entire actual processing based on instructions of the program so that the functions of the above-described exemplary embodiments are achieved.

While the present invention is described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-125454 filed on May 10, 2007, which is hereby incorporated by reference herein in its entirety.

What is claimed is:

1. An image-processing apparatus comprising:
   a read unit configured to read encoded video data from a recording medium;
   a decoding unit configured to decode the encoded video data;
   a record unit configured to record information indicating a number of times a playback operation is accepted for each of a plurality of time periods of decoded video data played back through the decoding unit;
   an encoding unit configured to re-encode the decoded video data transmitted from the decoding unit; and
   a bit-rate-determination unit configured to determine a target bit rate for each of the plurality of time periods when the re-encoding being performed by the encoding unit, according to the information indicating the number of times the playback operation is accepted for each of the plurality of the time periods
   wherein the bit-rate-determination unit increases the target bit rate for the time period which is played back many times based on the information so that the target bit rate becomes higher than a reference bit rate prepared in advance for the encoding unit.

2. The image-processing apparatus according to claim 1, wherein the encoding unit includes a rate-controlling unit configured to operate based on the target bit rate under a variable-bit-rate-encoding system.

3. The image-processing apparatus according to claim 1, wherein when the information is not recorded in the record unit, the bit-rate-determination unit uses a reference bit rate prepared in advance for the encoding unit.

4. An image-processing apparatus comprising:
   a read unit configured to read encoded video data from a recording medium;
   a decoding unit configured to decode the encoded video data;
   a record unit configured to record information indicating a specified playback speed for each of a plurality of time periods of decoded video data played back through the decoding unit;
   an encoding unit configured to re-encode the decoded video data transmitted from the decoding unit; and
   a bit-rate-determination unit configured to determine a target bit rate for each of the plurality of time periods when the re-encoding being performed by the encoding unit, according to the information indicating the specified playback speed for each of the plurality of the time periods,
   wherein the bit-rate-determination unit decreases the target bit rate for the time period which is fast-forwarded based on the information so that the target bit rate becomes lower than a reference bit rate prepared in advance for the encoding unit.

5. An image-processing apparatus comprising:
   a read unit configured to read encoded video data from a recording medium;
   a decoding unit configured to decode the encoded video data;
   a record unit configured to record information indicating a number of times an instruction to reference through a playlist is issued for each of a plurality of time periods of decoded video data played back through the decoding unit;
   an encoding unit configured to re-encode the decoded video data transmitted from the decoding unit; and
   a bit-rate-determination unit configured to determine a target bit rate for each of the plurality of time periods when the re-encoding being performed by the encoding unit, according to the information indicating the number of times an instruction to reference through a playlist is issued for each of the plurality of time periods,
   wherein the bit-rate-determination unit increases the target bit rate for the time period which is referred to through a playlist based on the information so that the target bit rate becomes higher than a reference bit rate prepared in advance for the encoding unit.

6. The image-processing apparatus according to claim 5, wherein the bit-rate-determination unit increases the target bit rate with increases in a number of times the time period is referred to through the playlist based on the information.

7. An image-processing method comprising:
   reading encoded video data from a recording medium;
   decoding the encoded video data;
   detecting information indicating a number of times a playback operation is accepted for each of a plurality of time periods of decoded video data played back through the decoding step;
   re-encoding the decoded video data obtained at the decoding step; and
   determining a target bit rate for each of the plurality of time periods when the re-encoding being performed at the encoding step, according to the information indicating the number of times the playback operation is accepted for each of the plurality of the time periods so that the target bit rate for the time period which is played back many times becomes higher than a reference bit rate prepared in advance for the re-encoding step.

8. A non-transitory medium readable by a machine, the medium storing a program of instructions for making the machine execute an image-processing method, the image-processing method comprising:

reading encoded video data from a recording medium;

decoding the encoded video data;

detecting information indicating a playback operation is accepted for each of a plurality of time periods of decoded video data played back through the decoding step;

re-encoding the decoded video data obtained at the decoding step; and determining a target bit rate for each of the plurality of time periods when the re-encoding being performed at the encoding step, according to the information indicating the number of times the playback operation is accepted for each of the plurality of the time periods so that the target bit rate for the time period which is played back many times becomes higher than a reference bit rate prepared in advance for the re-encoding step.

9. The non-transitory medium readable by a machine according to claim 8, wherein the machine is a computer.

10. The non-transitory medium readable by a machine according to claim 8, wherein the machine is a video recording apparatus.

11. The non-transitory medium readable by a machine according to claim 8, wherein program of instructions includes:

instructions for said reading;
instructions for said decoding;
instructions for said detecting;
instructions for said re-encoding; and
instructions for said determining.

12. The image-processing apparatus according to claim 4, wherein the encoding unit includes a rate-controlling unit configured to operate based on the target bit rate under a variable-bit-rate-encoding system.

13. The image-processing apparatus according to claim 4, wherein when the information is not recorded in the record unit, the bit-rate-determination unit uses a reference bit rate prepared in advance for the encoding unit.

14. A non-transitory medium readable by a machine, the medium storing a program of instructions for making the machine execute an image-processing method, the image-processing method comprising:

reading encoded video data from a recording medium;

decoding the encoded video data;

detecting information indicating a specified playback speed for each of a plurality of time periods of decoded video data played back through the decoding step;

re-encoding the decoded video data obtained at the decoding step; and determining a target bit rate for each of the plurality of time periods when the re-encoding being performed at the encoding step, according to the information indicating the specified playback speed for each of the plurality of the time periods so that the target bit rate for the time period which is fast-forwarded becomes lower than a reference bit rate prepared in advance for the re-encoding step.

15. The non-transitory medium readable by a machine according to claim 14, wherein the machine is a computer.

16. The non-transitory medium readable by a machine according to claim 14, wherein the machine is a video recording apparatus.

17. The non-transitory medium readable by a machine according to claim 14, wherein program of instructions includes:

instructions for said reading;
instructions for said decoding;
instructions for said detecting;
instructions for said re-encoding; and
instructions for said determining.

* * * * *